(12) United States Patent
Kanungo et al.

(10) Patent No.: US 6,407,759 B1
(45) Date of Patent: Jun. 18, 2002

(54) METHOD AND APPARATUS FOR MODAL DIALOG BOX MANAGEMENT IN APPLETS ON INFORMATION APPLIANCES

(75) Inventors: Rajesh Kanungo, Sunnyvale; Juan Carlos Soto, Jr., Palo Alto, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/203,224

(22) Filed: Nov. 30, 1998

(51) Int. Cl.[7] .............................. G06F 3/00; G06F 9/44
(52) U.S. Cl. ...................................................... 345/809
(58) Field of Search ................................. 345/808, 809, 345/780, 700, 764, 716, 719, 733, 738, 744, 781, 854, 804, 805, 975, 168; 707/501.1

(56) References Cited

U.S. PATENT DOCUMENTS

| | | | | |
|---|---|---|---|---|
| 5,414,810 A | * | 5/1995 | Doyle et al. ................. | 345/804 |
| 5,751,980 A | * | 5/1998 | Musashi et al. ............. | 345/840 |
| 5,821,932 A | * | 10/1998 | Pittore ......................... | 345/809 |
| 5,825,358 A | * | 10/1998 | Silvent et al. ............... | 345/809 |
| 5,838,969 A | * | 11/1998 | Jacklin et al. ............... | 709/318 |
| 5,900,024 A | * | 5/1999 | Morearty ...................... | 712/225 |
| 5,922,044 A | * | 7/1999 | Banthia ....................... | 709/203 |
| 5,973,612 A | * | 10/1999 | Deo et al. .................... | 340/7.58 |
| 5,977,969 A | * | 11/1999 | DiAngelo .................... | 345/780 |
| 6,018,345 A | * | 1/2000 | Berstis ......................... | 345/859 |
| 6,034,689 A | * | 3/2000 | White et al. ................. | 345/854 |
| 6,038,588 A | * | 3/2000 | Nagarajayya et al. ........ | 709/102 |
| 6,118,451 A | * | 9/2000 | Alexander ................... | 345/809 |
| 6,232,971 B1 | * | 5/2001 | Haynes ........................ | 345/800 |

OTHER PUBLICATIONS

Article by Jim Davis entitled: "Java Based TV guide on tap" CNET News.com, Nov. 2, 1998, http://www.news.com/News/Item/0%2C4%2C28178%2C00.html?st.ne.ni.lh, pp. 1–3.

(List continued on next page.)

*Primary Examiner*—Crescelle N. dela Torre
(74) *Attorney, Agent, or Firm*—Beyer Weaver & Thomas LLP

(57) ABSTRACT

A method and apparatus that allows the user to escape from unwanted Java modal dialog boxes displayed by an applet, even though the Java modal dialog box does not contain a user interface designed to cancel or remove the dialog box from the display. The described embodiment allows the user to use so-called "escape" keys to indicate that the Java modal dialog box should be removed and/or closed. In general, these escape keys have other purposes in addition to removing the Java modal dialog box. A first escape key is a "back" key. Although the back key is typically used within a web browser to return to a previously viewed web page, in dialog box mode, the effect of the back key is to remove the dialog box from the display (under certain circumstances, as discussed below). A second escape key in the described embodiment is the "goto" key. The present invention detects a goto key press before the key press is sent to the Java modal dialog box, and replaces the page containing the errant applet with a new page.

14 Claims, 12 Drawing Sheets

Main Browser Loop

OTHER PUBLICATIONS

Article by Alex Lash entitled: "PersonalJava ships to licensees" Cnet News.com, Jan. 8, 1998, http://www.news.com/News/Item/0,4,17938,00.html?st.ne.ni.rel, pp. 1–3.

Webpage by WebTV Network™ Service (Microsoft™) entitled: "WebTV" http://www.webtv.com/home/index.html. p. 1.

Webpage by Sun Microsystems entitled: "Manage Your Enterprise from Anywhere Introducing Sun Enterprise SyMON 2.0" http://www.sun.com/, pp. 1–2.

Webpage by WebTV Network™ Service (Microsoft™) entitled: "WebTV—Products & Services" http://www.webtv.com/products/comparison.html pp. 1–3.

Webpage by Stephen Shankland entitled: "Sun buys Canadian firm Beduin" CNET News.com Oct. 20, 1998, http://www.news.com/News/Item/0,4,27739,00.html, pp. 1–4.

* cited by examiner

Example of a modal dialog box

Main Browser Loop

Main JVM Loop

"Goto" Event Loop
(in browser)

Example of a Goto dialog box

After "goto" performed, modal dialog box is hidden and new page is displayed

Example of a Goto dialog box

METHOD AND APPARATUS FOR MODAL DIALOG BOX MANAGEMENT IN APPLETS ON INFORMATION APPLIANCES

RELATED APPLICATIONS

The following applications, are filed concurrently herewith and are incorporated herein by reference:

1. U.S. patent application Ser. No. 09/203,183, entitled "Applet and Application Display in Embedded Systems Using Child and Orphan Graphics Contexts" of Rajesh Kanungo;
2. U.S. patent application Ser. No. 09/203,043, now U.S. Pat. No. 6,266,056 entitled "Display Widget Interaction in Embedded Systems Using Child Graphics Contexts" of Rajesh Kanungo;
3. U.S. patent application Ser. No. 09/201,685, entitled "TV PIP Applet Using PIP Framework and Implementation" of Rajesh Kanungo; and
4. U.S. patent application Ser. No. 09/203,223, entitled "TV PIP Using Java API Classes and Java Implementation Classes" of Rajesh Kanungo.

FIELD OF THE INVENTION

This application relates to a method and apparatus to control a simple computer system and, specifically, to a method and apparatus that manages Java modal dialog boxes in an information appliance having a simple user interface.

BACKGROUND OF THE INVENTION

Many conventional World Wide Web browsers are capable of executing Java applets. A Java applet is a computer program written in the Java programming language that is designed to execute within a World Wide Web browser. Such applets are often started when a user clicks on a button or link in a displayed Web page. Once started, an applet executes "inside" the browser, performing whatever tasks it has been programmed to perform. "Java" is a trademark of Sun Microsystems, Inc. in the United States and other countries.

One task that applets often perform is to ask a user for information. A Java applet may open a "Java modal dialog box" on the display and wait for the user to input data in an indicated location in the modal dialog box. A modal dialog box is defined as a dialog box that will not leave the display until the user has entered the requested information. The system will stay in dialog box mode until the user enters the requested information. This situation occurs because conventional browsers tend to route all user input directly to a modal dialog box in a Java execution environment whenever a modal dialog box is open. Thus, if a modal dialog box is open, all user input is sent to the current Java applet. In many conventional systems, this means that many of the normal navigation keys are grayed out or inoperable when a dialog box is displayed.

In conventional systems, it sometimes happens that an applet displays a modal dialog box, but the user does not wish to enter the requested information or wishes to end execution of the applet. In conventional computer systems, some applets are well-behaved and provide an on screen mechanism within the modal dialog box itself that allows the user to get rid of the modal dialog box (through, for example, an input choice displayed within the modal dialog box). In conventional computer systems, even if the applet is poorly behaved and does not provide an onscreen mechanism within the modal dialog box that allows the user to escape from the modal dialog box, the user has options that will enable him to escape and to remove the dialog box from the screen.

For example, the user may perform a warm reboot of the computer (by, for example, pressing control/alt/delete in a Windows environment). Although rebooting stops execution of the applet, it does allow the user to get rid of the dialog box. As another example, the user might enter a "window close" command via an operating system interface. Thus, poorly behaved applets that do not provide an onscreen mechanism for closing their own dialog boxes are not a severe problem in conventional computer systems.

In recent years, a new category of computing device called "information appliances" has become popular. Certain applets pose a more severe problem for these information appliances because information appliances contain simple, easy to use user-interfaces. For example, set-top boxes for televisions typically include only the set top box and a handheld remote unit. The remote unit contains a variety of keys or buttons indicating commands such as "up," "down," "select," etc. The output for the system is displayed on a television set or similar monitor connected to the set top box. Typically, the user enters his input via a limited number of keys or buttons on the remote unit.

In the past, conventional set top boxes have not been able to execute Java applets on a web page. If, however, a set top box were to be capable of executing Java applets, the simple interface of the set top box would become problematic. For example, most set top boxes do not contain a way for the user to perform a warm reboot of the system. Thus, there is no provision for the user to perform a warm reboot of the system when an errant applet displays an unwanted modal dialog box in an information appliance. Similarly, conventional set top boxes are not designed so that the user can input operating system commands. Thus, a user cannot enter an operating system command to close a modal dialog box or to partially reboot the system, and the user may not want to turn off the system.

Accordingly, a need exists for a system and method implemented in information appliances that allow the user to escape from unwanted Java modal dialog boxes displayed by an applet.

SUMMARY OF THE INVENTION

A described embodiment of the present invention allows the user to escape from unwanted modal dialog boxes displayed by an applet, even though the modal dialog box does not contain a user interface designed to cancel or remove the dialog box from the display. The described embodiment allows the user to use so-called "escape" keys to indicate that the modal dialog box should be removed and/or closed. In general, these escape keys have other purposes within the user interface in addition to removing the modal dialog box.

A first escape key is a "back" key. Although the back key is typically used within a web browser to return to a previously viewed web page, in dialog box mode, the effect of the back key is to remove a Java modal dialog box from the display (under certain circumstances, as discussed below). A second escape key in the described embodiment is the "goto" key. The present invention detects a goto key press before the key press is sent to the Java modal dialog box, and allows the user to enter another page address (for example, a URL). Thus, a new page is displayed instead of the page containing the applet that displayed the dialog box.

In accordance with the purpose of the invention, as embodied and broadly described herein, the invention relates to a method performed by a browser to escape from a displayed dialog box generated by an errant applet, comprising: diverting user input from the applet to a main browser loop; receiving a user key press; and if the user key press is a first escape key, sending a close window event to an execution environment of the applet.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF PREFERRED EMBODIMENTS

I. General Discussion

Figure 1A:
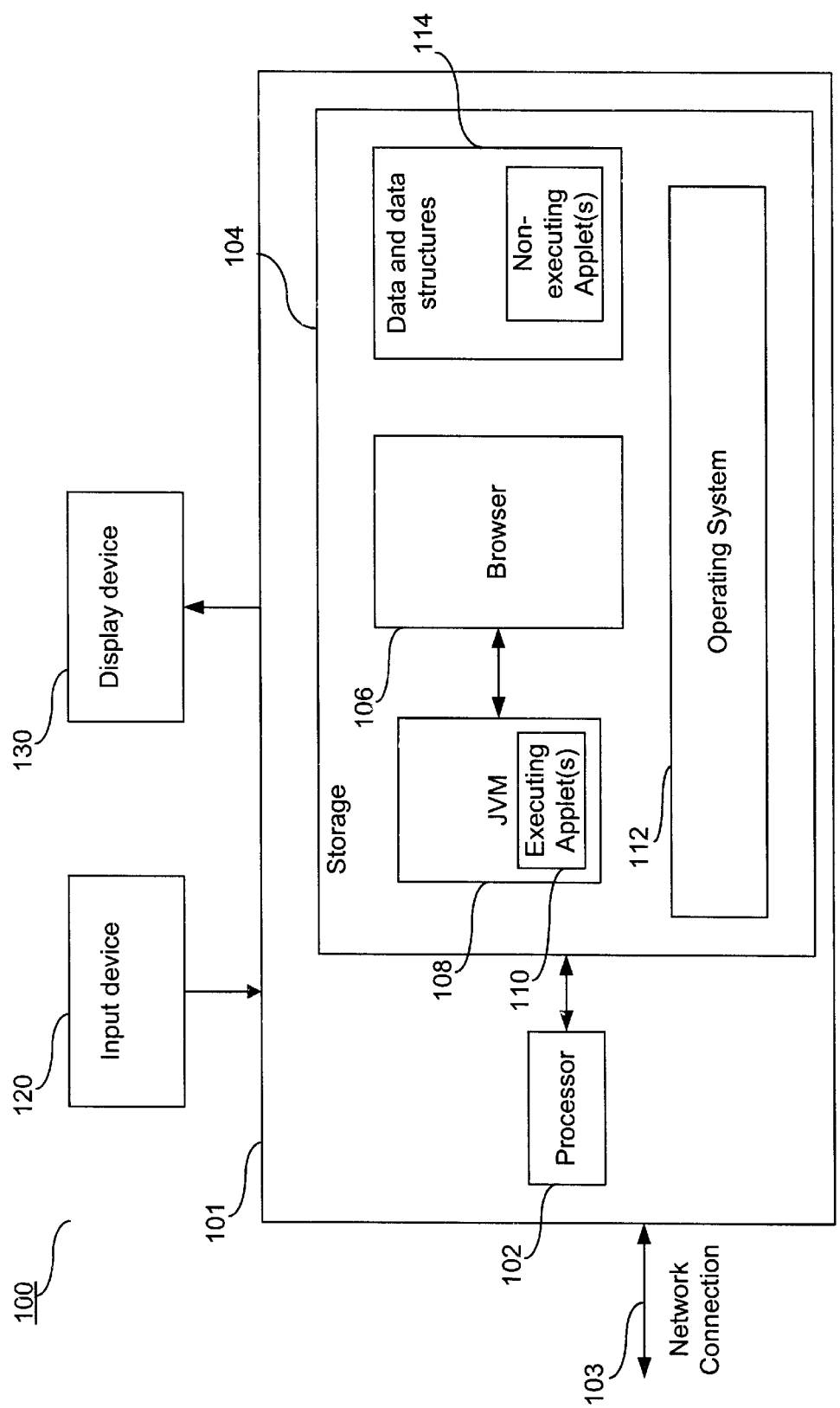
FIG. 1(a) is a block diagram of a data processing system in accordance with one embodiment of the present invention.

FIG. 1(a) is a block diagram of a data processing system 100 in accordance with one embodiment of the present invention. Data processing system 100 can be, for example, a set top box 101 connected to a display device 130, such as, for example, a television set or some other appropriate display device. Data processing system 100 can also be, for example, any data processing system that does not allow the user to have access or control of its operating system or that does not allow the user to warm boot the system at certain times.

System 100 includes a processor 102 and a data storage area (e.g., a memory) 104. Data storage area 104 includes certain well-known types of information, such as operating systems 112 and data and data structures 114. In the embodiment shown, data and data structures 114 include, for example, web pages capable of being displayed by a browser 106. Data and data structures 114 can also include, for example, applet software capable of being executed by a Java virtual machine (JVM) 108. Storage area 104 preferably also includes software (not shown) for communicating with a network connection 103, which can be a LAN, WAN, intranet, or the internet. The system also contains a video line 390, which conveys video signals (such as television signals) to the set top box.

A person of ordinary skill in the art will understand that system 100 may also contain additional elements, such as input/output lines; additional or second input devices, such as a keyboard, a mouse, and a voice input device; and display devices, such as a display terminal. System 100 may also include a computer readable input device (not shown), such as a floppy disk drive, CD ROM reader, a chip connector, a chip connector, or a DVD reader, that reads computer instructions stored on a computer readable medium, such as a floppy disk, a CD ROM, a memory chip, or a DVD disk. System 100 also may include application programs, operating systems, data, etc., which are not shown in the figure for the sake of clarity.

In the following discussion, it will be understood that the steps of methods and flow charts herein discussed herein can be performed by processor 102 (or another appropriate processor) executing instructions stored in storage area 104 (or other appropriate memories or storage areas). It will also be understood that the invention is not limited to any particular implementation or programming technique and that the invention may be implemented using any appropriate techniques for implementing the functionality described herein. The invention is not limited to any particular programming language or operating system.

The instructions in storage area 104 may be read into storage area 104 from a computer-readable medium (not shown). Execution of sequences of instructions contained in main memory causes processor 102 (or a similar processor) to perform the processes described herein. In alternative embodiments, hard-wired circuitry may be used in place of or in combination with software instructions to implement the invention. Thus, embodiments of the invention are not limited to any specific combination of hardware circuitry and software.

Figure 1B:
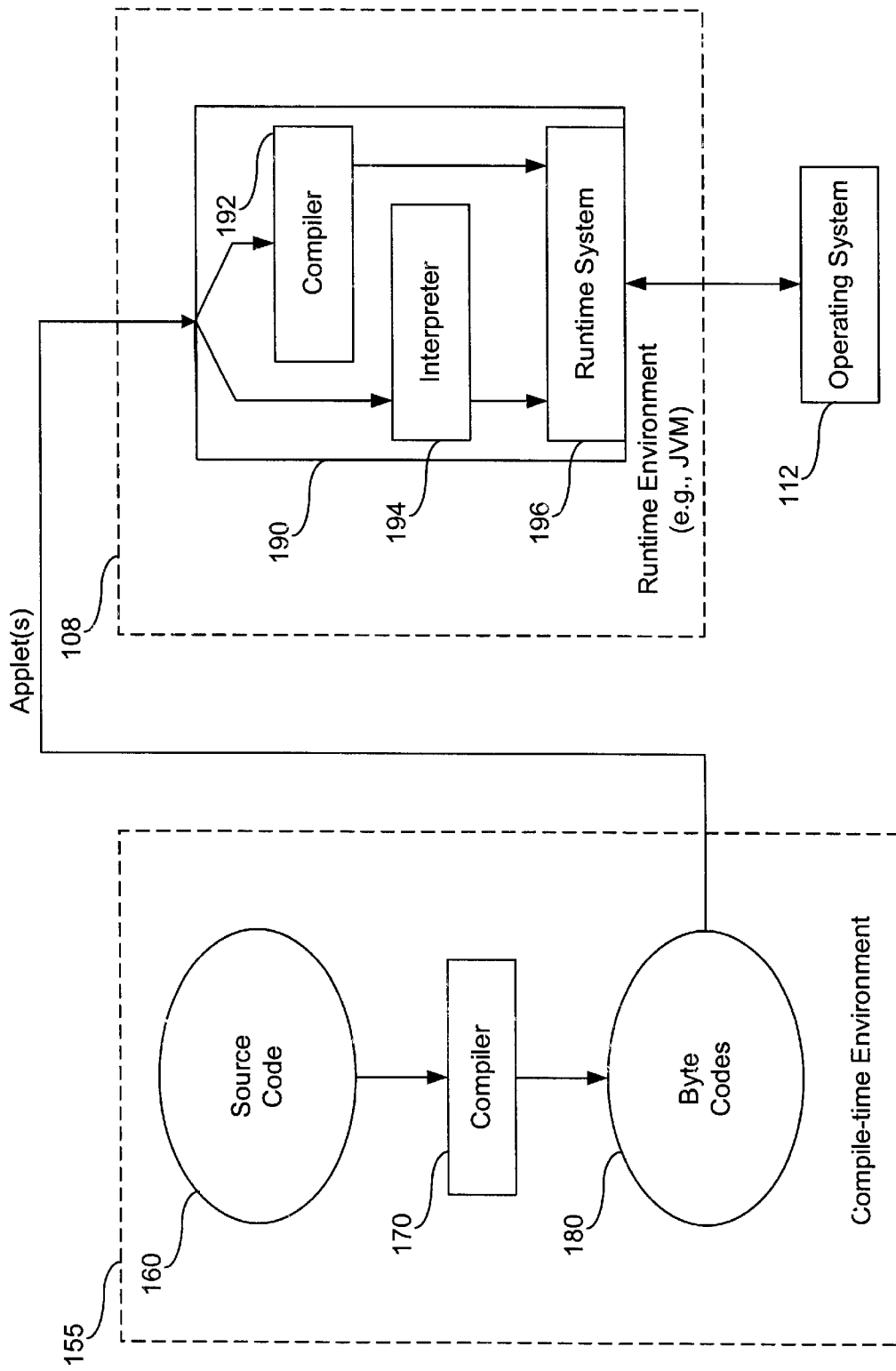
FIG. 1(b) is a block diagram of a data processing system in accordance with one embodiment of the present invention.

FIG. 1(a) shows a virtual machine (such as a Java virtual machine) executing on system 100. FIG. 1(b) is a block diagram of a virtual machine that is supported by system 100 of FIG. 1(a), and is suitable for implementing the present invention. When a computer program, e.g., a computer program written in the Java programming language, is executed, source code 160 is provided to a compiler 170 within compiletime environment 155. Compiler 170 translates source code 160 into bytecodes 180. In general, source code 160 is translated into bytecodes 180 at the time source code 160 is created by a software developer.

Bytecodes 180 may generally be reproduced, downloaded, or otherwise distributed through a network, e.g., network 103 of FIG. 1(a), or stored on a storage device such as primary storage 104 of FIG. 1(a). In the described embodiment, bytecodes 180 are platform independent. That is, bytecodes 180 may be executed on substantially any computer system that is running on a suitable virtual machine.

Bytecodes 180 are provided to a runtime environment 108, which includes virtual machine 190. Runtime environment 108 may generally be executed using a processor or processors such as processor 102 of FIG. 1(a). Virtual machine 109 includes a compiler 192, an interpreter 194, and a runtime system 196. Bytecodes 180 may be provided either to compiler 192 or to interpreter 194.

When bytecodes 180 are provided to compiler 192, methods contained in bytecodes 180 are compiled into machine instructions. In one embodiment, compiler 192 is a just-in-time compiler, which delays the compilation of methods contained in bytecodes 180 until the methods are about to be executed. When bytecodes 180 are provided to interpreter 194, bytecodes 180 are read into interpreter 194 one bytecode at a time. Interpreter 194 then performs the operation defined by each bytecode as each bytecode is read into interpreter 194. That is, interpreter 194 "interprets" bytecodes 180, as will be appreciated by those skilled in the art.

When a method is invoked by another method, or is invoked from runtime environment 108, if the method is interpreted, runtime system 196 may obtain the method from runtime environment 108 in the form of sequences of bytecodes 180, which may be directly executed by interpreter 194. If, on the other hand, the method that is invoked is a compiled method that has not been compiled, runtime system 108 also obtains the method from runtime environment 108 in the form of a sequence of bytecodes 108, which then may go to activate compiler 192. Compiler 194 then generates machine instructions from bytecodes 180, and the resulting machine-language instructions may be executed directly by processor 102 (or other appropriate processors). In general, the machine-language instructions are discarded when virtual machine 109 terminates. The operation of virtual machines or, more particularly, Java virtual machines, is described in more detail in *The Java Virtual Machine Specification* by Time Lindholm and Frank Yellin (ISBN 0-201-63452-X), which is incorporated herein by reference.

II. Detailed Discussion

Figure 2:
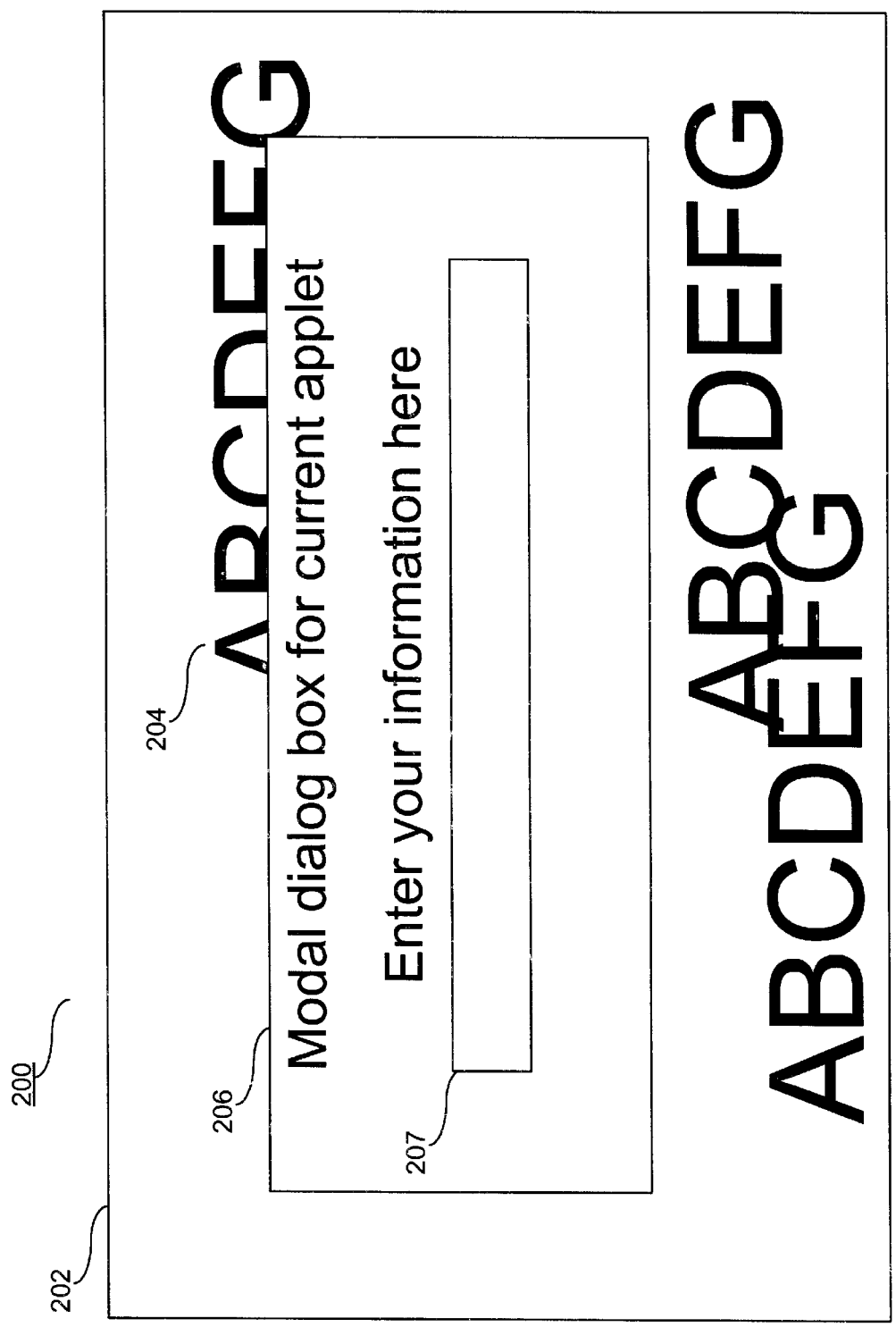
FIG. 2 shows a modal dialog box displayed on a display device.

FIG. 2 shows a modal dialog box 206 displayed on a display device 202. As discussed above, display device 202 can be a television set or any other appropriate display device. As will be appreciated by persons of ordinary skill in the art, modal dialog box 206 is generated on display 202 by a Java applet running in execution environment 108. Modal dialog box 206, which, in the example, is displayed on top of the contents of the web page containing the applet, includes an area 207 in which the user is supposed to enter data. Other modal dialog boxes may contain buttons, sliders, or similar user input devices. As discussed above, the problem posed by a modal dialog box such as modal dialog box 206 is that the modal dialog box itself contains no way for the user to "cancel" or "escape" from the box. (In contrast, well-behaved applets often cause a "cancel" button to be displayed within the dialog box). The applet will continue to display the dialog box until the user enters data in the box 207 (or makes use of whatever input mechanism is provided by a given dialog box). Thus, the applet displaying modal dialog box 206 is an "errant" applet, since it does not provide an explicit mechanism for the user to escape from its dialog box. An errant applet may also provide a display mechanism (for example, a cancel button) but may not execute the appropriate actions to dismiss the dialog box.

Figure 3:
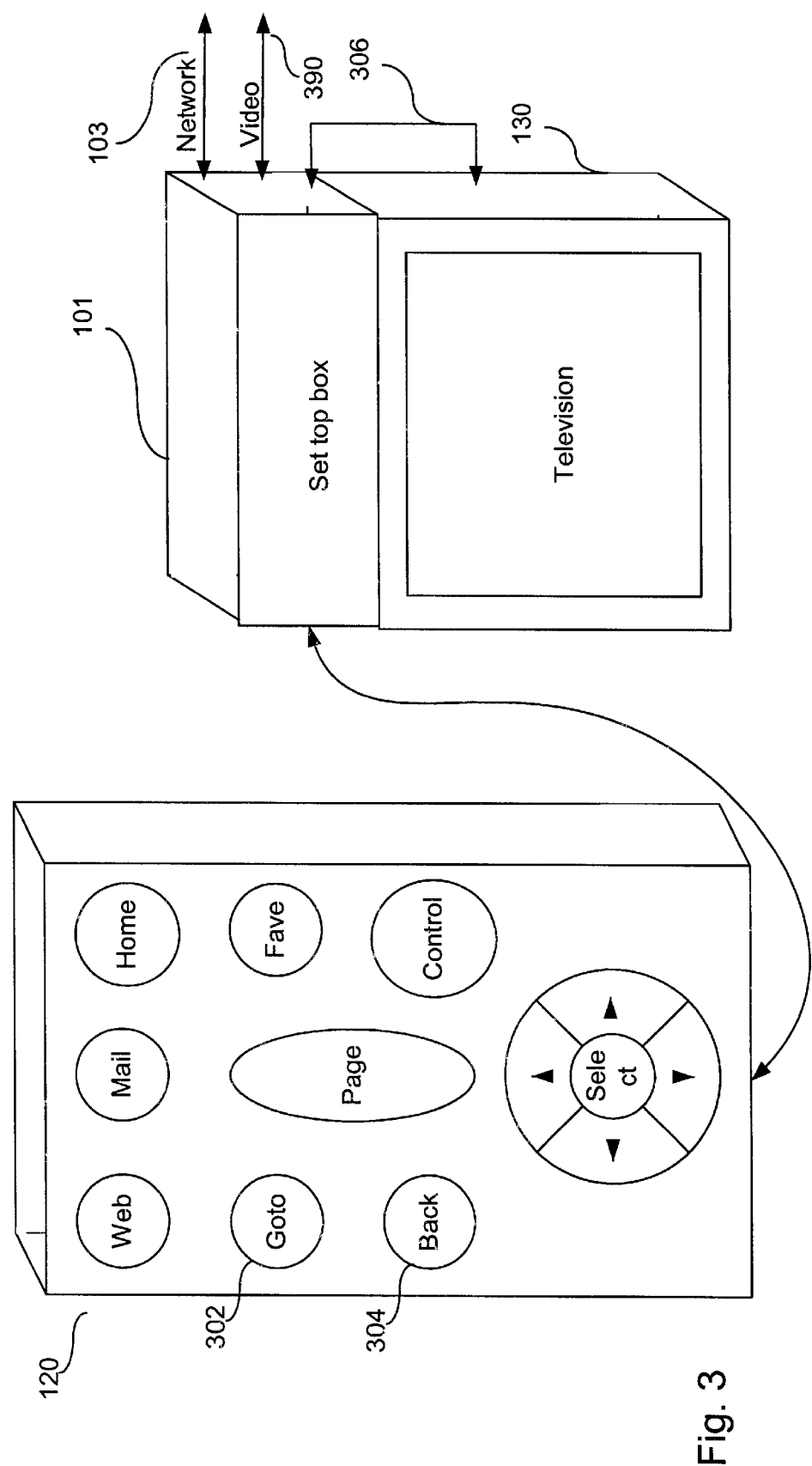
FIG. 3 shows an example of a set top box system, including a remote unit, which can be used as an input device.

FIG. 3 shows an example of a set top box system, including a set top box 101 connected to a television 130 and a remote unit 120. Remote unit 120, which is used as an input device, is not shown to scale. An actual remote unit is generally of a size appropriate to fit in a user's hand. Similarly, set top box 101 and television 120 are not necessarily shown to scale. In the described system, set top box 101 contains no switches or similar provisions for warm re-booting the system.

It will be understood that the button arrangement shown on remote unit 120 are for purposes of example only and are not to be interpreted in a limiting sense. Remote unit 120 includes a "back" button 302 and a "goto" button 304. As will be appreciated, a conventional use of back button 302 is to display a previously displayed web page. Similarly, a conventional use of "goto" button 304 is to allow the user to specify and view a new web page.

In the example of FIG. 3, however, "back" button 302 and "goto" button 304 also function as "escape" keys whenever the system is displaying a Java modal dialog box. That is, as discussed below in detail, back" button 302 and "goto" button 304 allow the user to escape from Java modal dialog boxes displayed by errant applets, even when the dialog box contains no explicit mechanism for escape.

Figure 4:
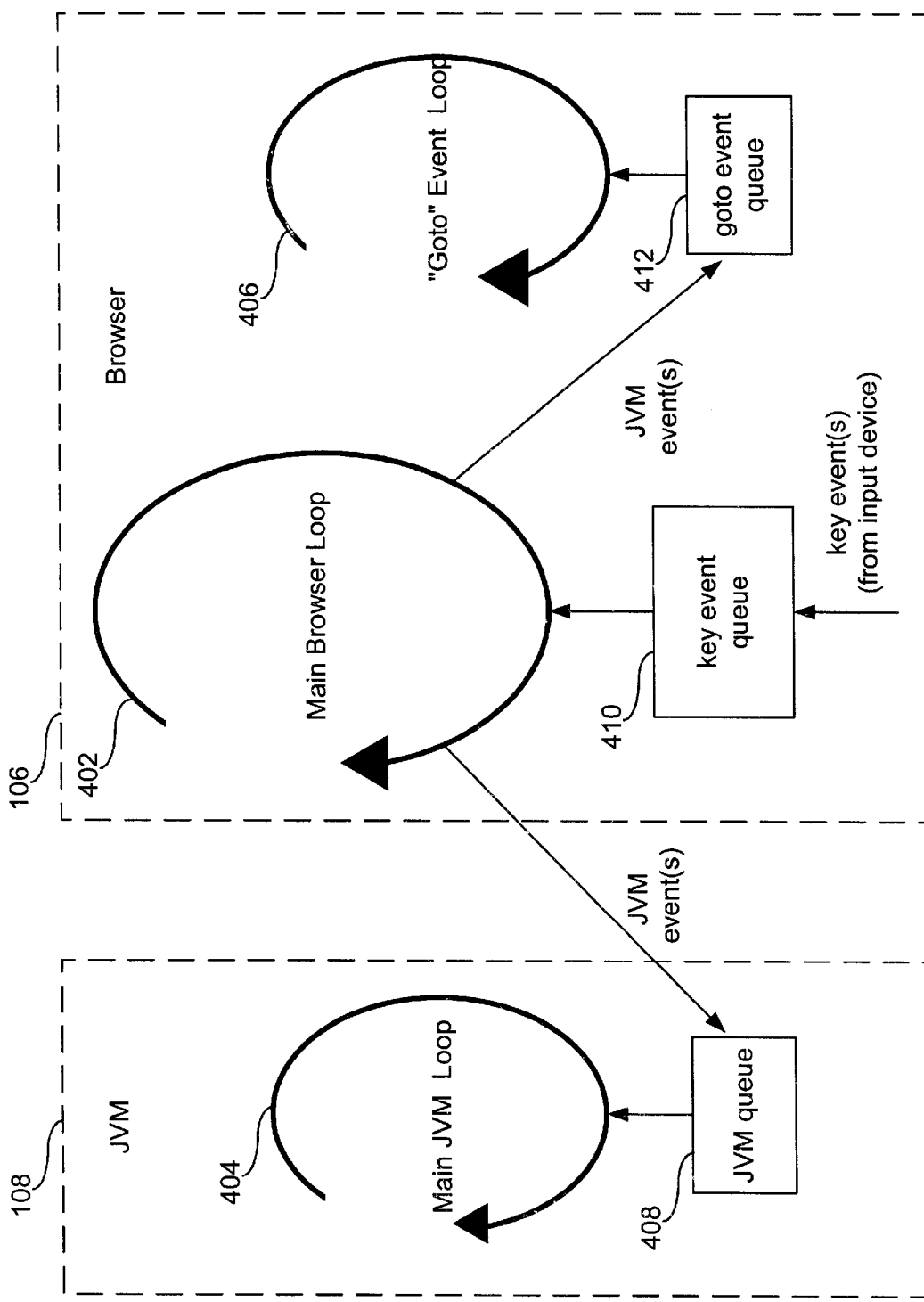
FIG. 4 a diagram of processing loops in the system of FIG. 1.

FIG. 4 a diagram of processing loops in the system of FIG. 1. As is shown in the Figure, these loops include a main browser loop 402 and a goto event loop (both of which are performed by browser 106 of FIG. 1. A main JVM loop 404 is performed by JVM 108. A key event queue 410 receives "key events," for example, key presses from remote unit 206 and queues them for input to main browser loop 402. A goto event queue 412 receives "goto events," for example, data indicating the address of a new web page to be displayed, and queues them for input to goto event loop 406. A JVM queue 408 receives "JVM events," from the main browser loop and queues them for input to main JVM loop 404. In the described embodiment, each of loops 402, 404, and 406 are implemented as a thread executed by processor 102.

Figure 5:
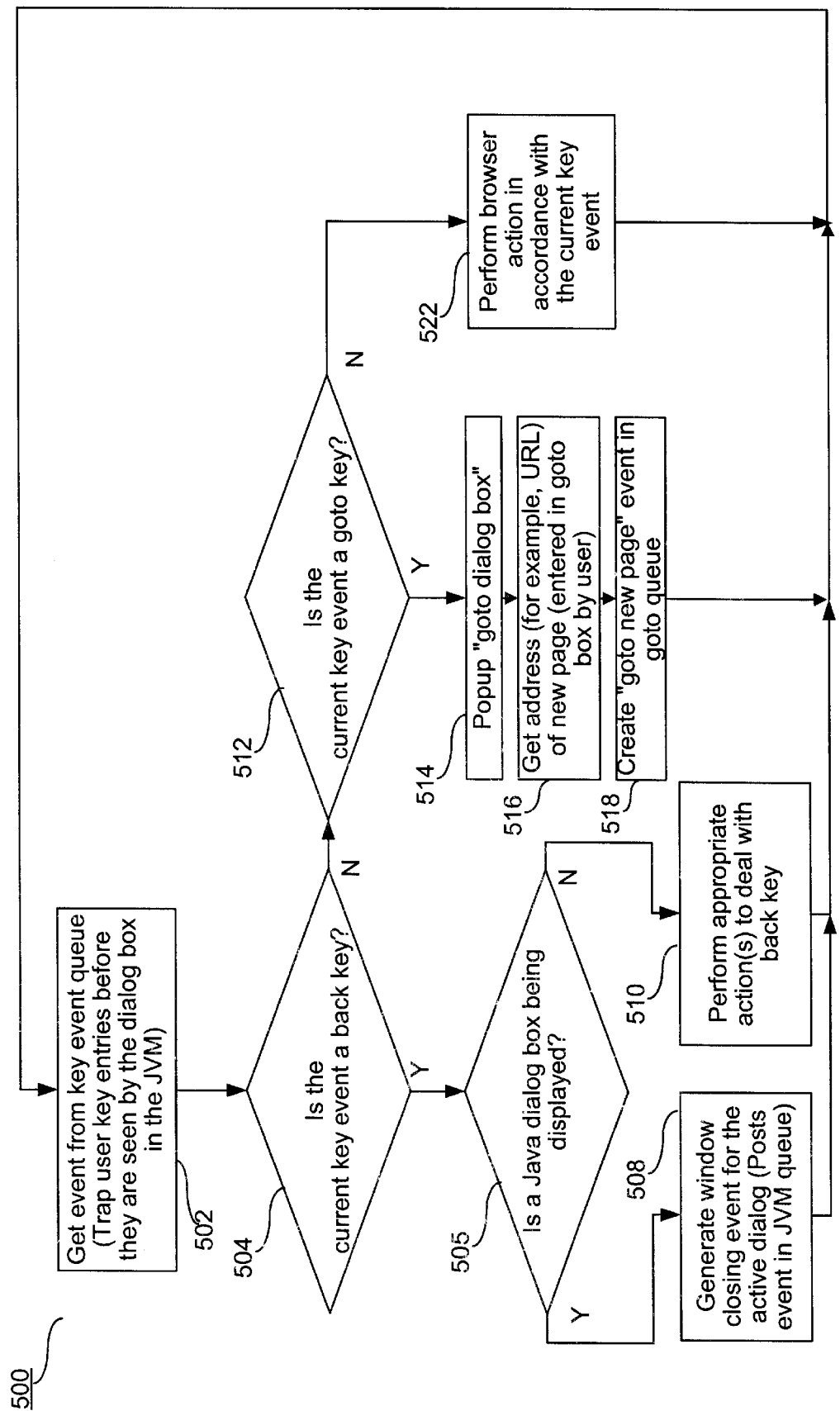
FIG. 5 is a flow chart of an exemplary main browser loop.

FIG. 5 is a flow chart 500 of an exemplary main browser loop 402. The flowchart of FIG. 5 is preferably performed by processor 102 executing browser code. In the described embodiment, browser 106 is written in the C++ programming language, but could be written using any appropriate programming language.

Step 502 retrieves an event from event queue 410. In the described embodiment, the user's key presses are trapped before they are seen by the running applet (or its dialog box). This differs from conventional systems, which generally route all input to a currently running applet. Thus, "escape" keys, such as the "back" key and the "goto" key are seen first by the main browser loop, which processes them as described below.

If, in step 504, the current key event is a "back" key, control passes to step 505. Otherwise, control passes to step 512. In step 505, the user has pressed the back key. If a dialog box is being displayed, the user wishes to escape from the displayed dialog box. Presumably, the dialog box is being displayed by an errant applet and cannot be easily removed by the user, although the steps of FIG. 5 would work for any displayed dialog box. Step 508 generates a window closing event for the active dialog box and posts it in the JVM queue 408. In step 510, the user has pressed the back key, but no dialog box is currently being displayed. Under these circumstances, the system performs action(s) appropriate to a back key. For example, the system might display the previously displayed web page.

If, in step 512, the current key event is a "goto" key, control passes to step 514. Otherwise, control passes to step 522. In step 514, the user has pressed the goto key. As discussed, in conventional systems, a goto key press is not trapped by the browser, but is sent directly to the dialog box. In the described embodiment, the user is allowed to "goto" a new web page even when a Java modal dialog box is being displayed. Presumably, the dialog box is being displayed by an errant applet and cannot be easily removed by the user, although the steps of FIG. 5 would work for any displayed dialog box. Step 514 pops up a goto dialog box as shown in FIG. 8(*a*).

Figure 8A:
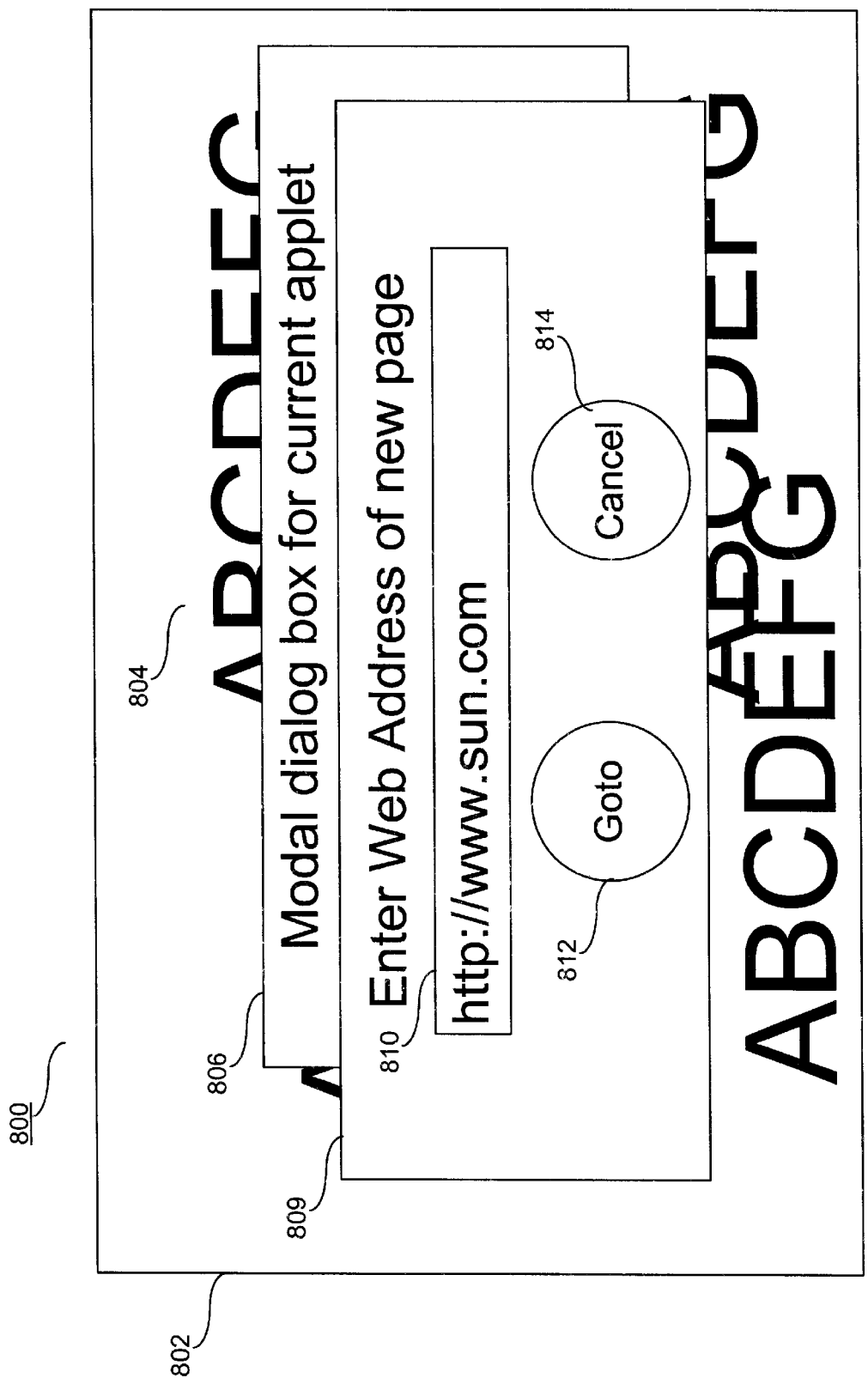
FIG. 8(a) shows an example of a display including a goto dialog box.

FIG. 8(a) shows an example of a display 802 including a goto dialog box 809. In the example, the goto dialog box is displayed on top of the Java modal dialog box 806, which is displayed on web page content 804. Example goto dialog box 809 includes an area 810 for user input, a second goto button 812 (different from goto button 302 of FIG. 3), and a cancel button 814.

In step 516 of FIG. 5, the browser loop waits (without blocking other threads) for the user to enter the address of a new page (e.g., http://www.sun.com) and then to press goto button 812. (The user can alternately press cancel button 814, not shown in FIG. 5). Step 518 creates a goto new page event in goto queue 406. After any of steps 508, 510, or 522, control returns to the top of the loop (step 502).

In the described embodiment, main browser loop 500 is performed approximately five times per second, although any appropriate loop frequency can be employed. Moreover, although loop 500 shows two escape keys (backup and goto), other embodiments of the present invention may implement other escape keys not explicitly mentioned herein. For example, another embodiment may treat keys other than the back key in the way described herein for the back key. Similarly, another embodiment may trap and process only the back key, only the goto key, or only some other escape key in the manner described herein.

Figure 8B:
FIG. 8(b) shows an example of the display of FIG. 8(b) after the goto function has been performed.

FIG. 8(b) shows an example of the display of FIG. 8(b) after the goto function has been performed during display of a Java modal dialog box. As shown in the figures, browser 106 has fetched and displayed new page content 804'. In addition, the Java modal dialog box 806 is hidden (by the JVM loop) and the goto box 809 is removed (by the goto loop).

Figure 6:
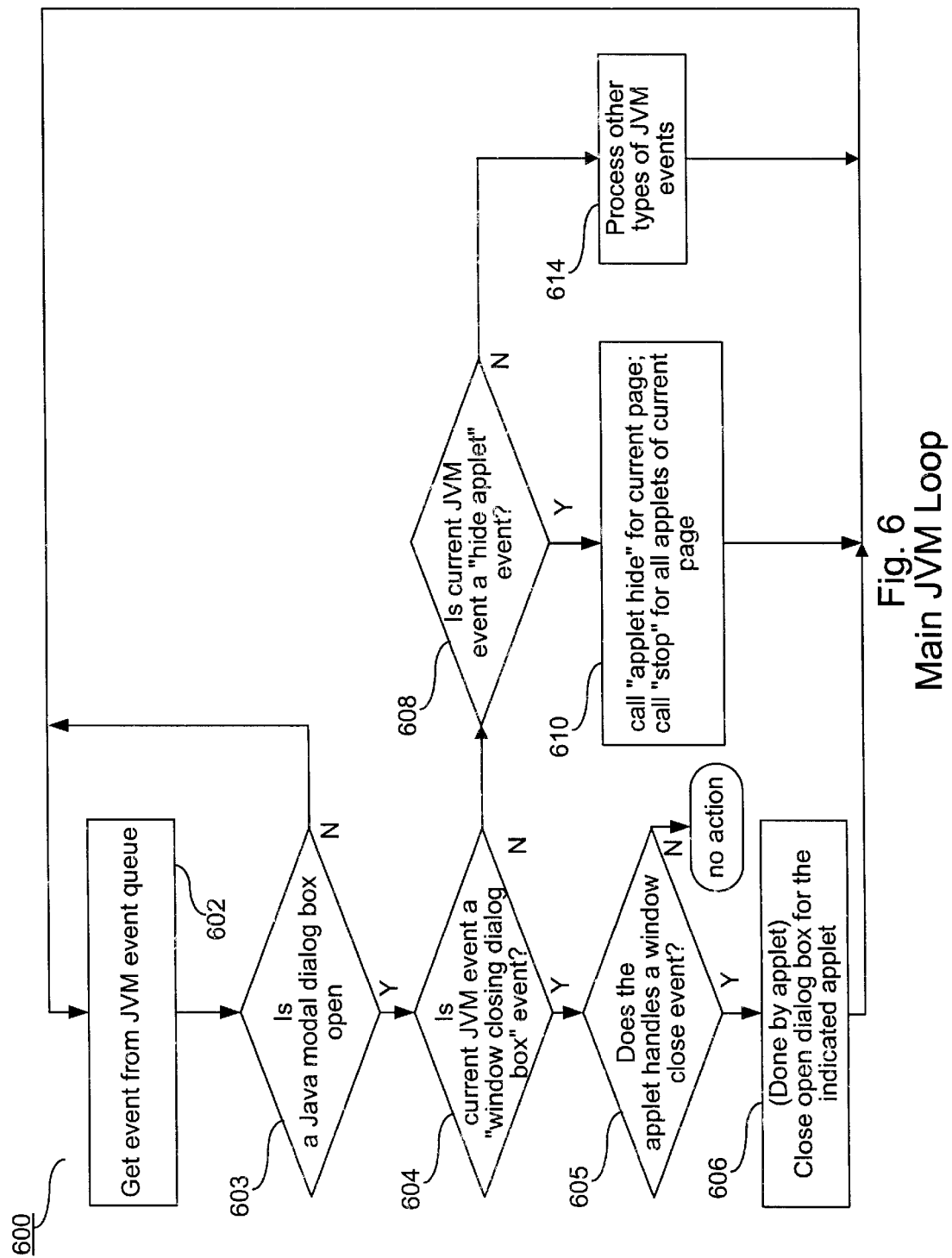
FIG. 6 is a flow chart of an exemplary JVM processing loop.

FIG. 6 is a flow chart 600 of an exemplary JVM loop 404. As discussed above in connection with FIG. 1(b), JVM 108 executes Java applets contained on a current web page. JVM 108 also retrieves and processes events on JVM queue 408 during JVM loop 404. The process of FIG. 6 is performed when there is an open Java modal dialog box present (step 603). If, in step 604, the current JVM event is a "window closing dialog box" event, control passes to step 605. Otherwise, control passes to step 608. Step 604 determines whether the applet handles a "window closing" event. Well-coded applets will generally include code to handle such an event. Even errant applets that do not include a mechanism in their dialog boxes for the user to escape from the dialog box will often include code to handle a window closing event. If such code is present, the applet closes the open dialog box and (in this simple example) control returns to the top of the loop.

If, however, the applet does not handle a window closing event, no action is taken. From the user's point of view, when a Java modal dialog box is displayed, he presses the back key, but nothing happens. In the described embodiment, the user's next option is to press the "goto key" and escape from the Java modal dialog box by going to a new page. (This will also have the effect of stopping the executing applet).

If, in step 608, the current JVM event is a "hide applet" event, control passes to step 610. A hide applet event is generated, for example, by step 704 of FIG. 7 in response to the user pressing the goto button to escape from a dialog box. Step 610 cleans up the current page (including closing any open dialog boxes that were opened by applets on the current page and stopping execution of any current applets). This entails calling "applet hide" for current page and calling "stop" for all applets of current page. Thus, as shown in FIGS. 8(a) and 8(b), the problematic Java modal dialog box 806 is closed in response to events generated by the browser in response to a goto key press by the user.

Figure 7:
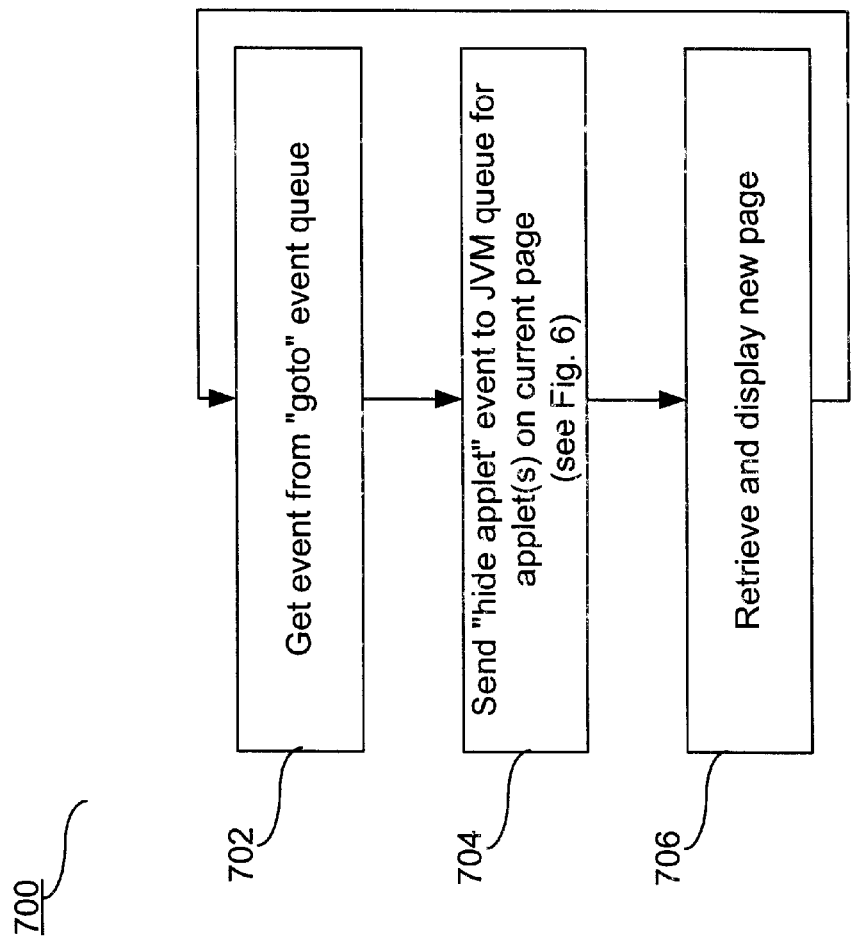
FIG. 7 is a flow chart of an exemplary goto processing loop.

FIG. 7 is a flow chart 700 of an exemplary goto processing loop 406. In the described embodiment, browser 106 (which executes goto loop 404) is written in the C++ programming language, but could be written using any appropriate programming language. Step 702 retrieves an event from goto queue 412. Step 704 sends a "hide applet" event to JVM queue for applet(s) on the current page (see FIG. 6). Step 706 retrieves and displays the new Web page indicated by the event.

Figure 9:
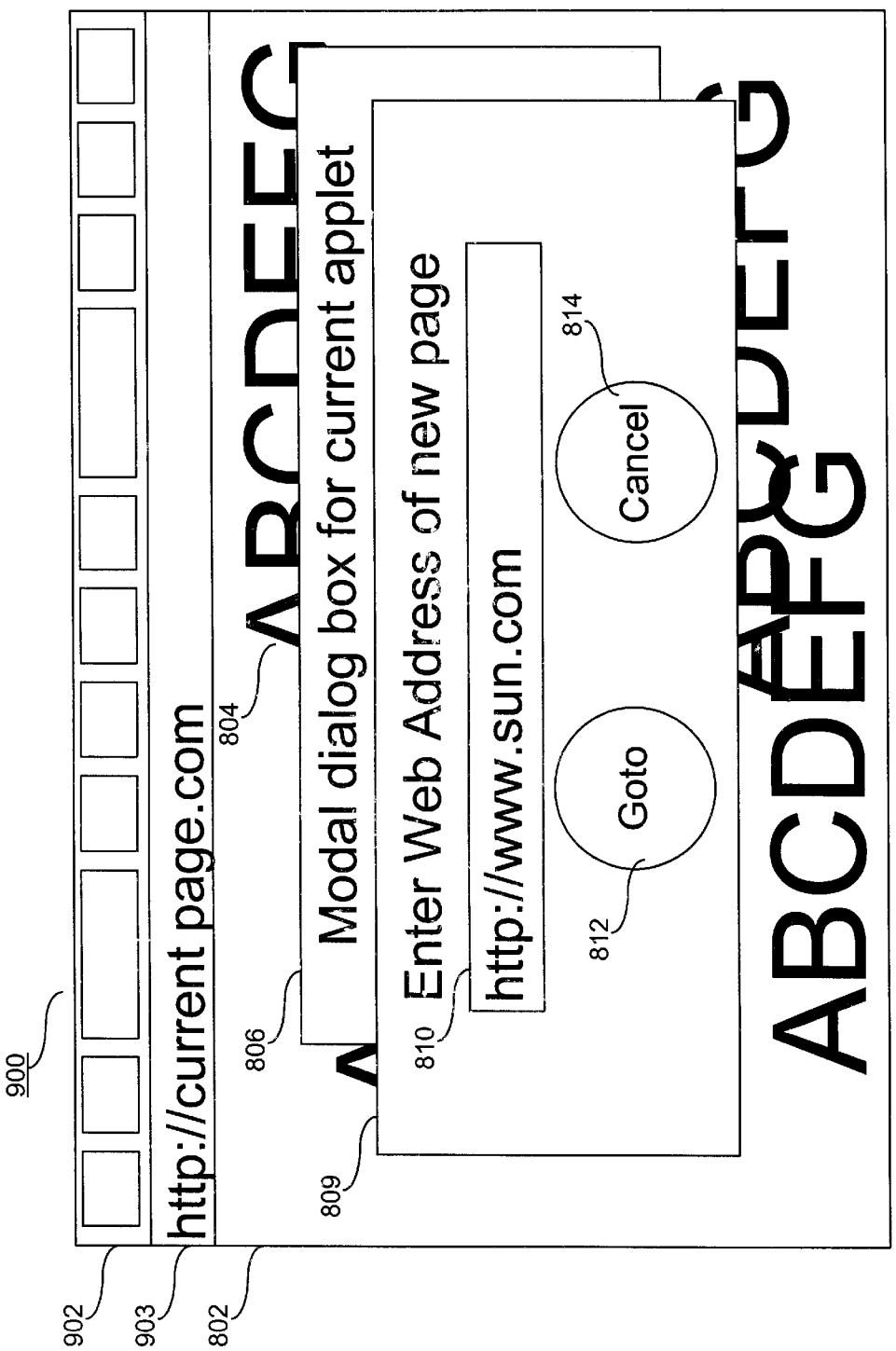
FIG. 9 shows an example of a second display including a goto dialog box.

FIG. 9 shows a second example of a second display including a goto dialog box. Note that, in FIG. 9, browser 106 generates a browser user interface with a URL line 903 and additional interface elements 902. As shown in FIG. 2, not all browsers will display URL line 903. In the embodiment of FIG. 9, the URL line is inactive when a Java modal dialog box is displayed, so the only way to perform a goto function is through a goto dialog box.

Figure 10:
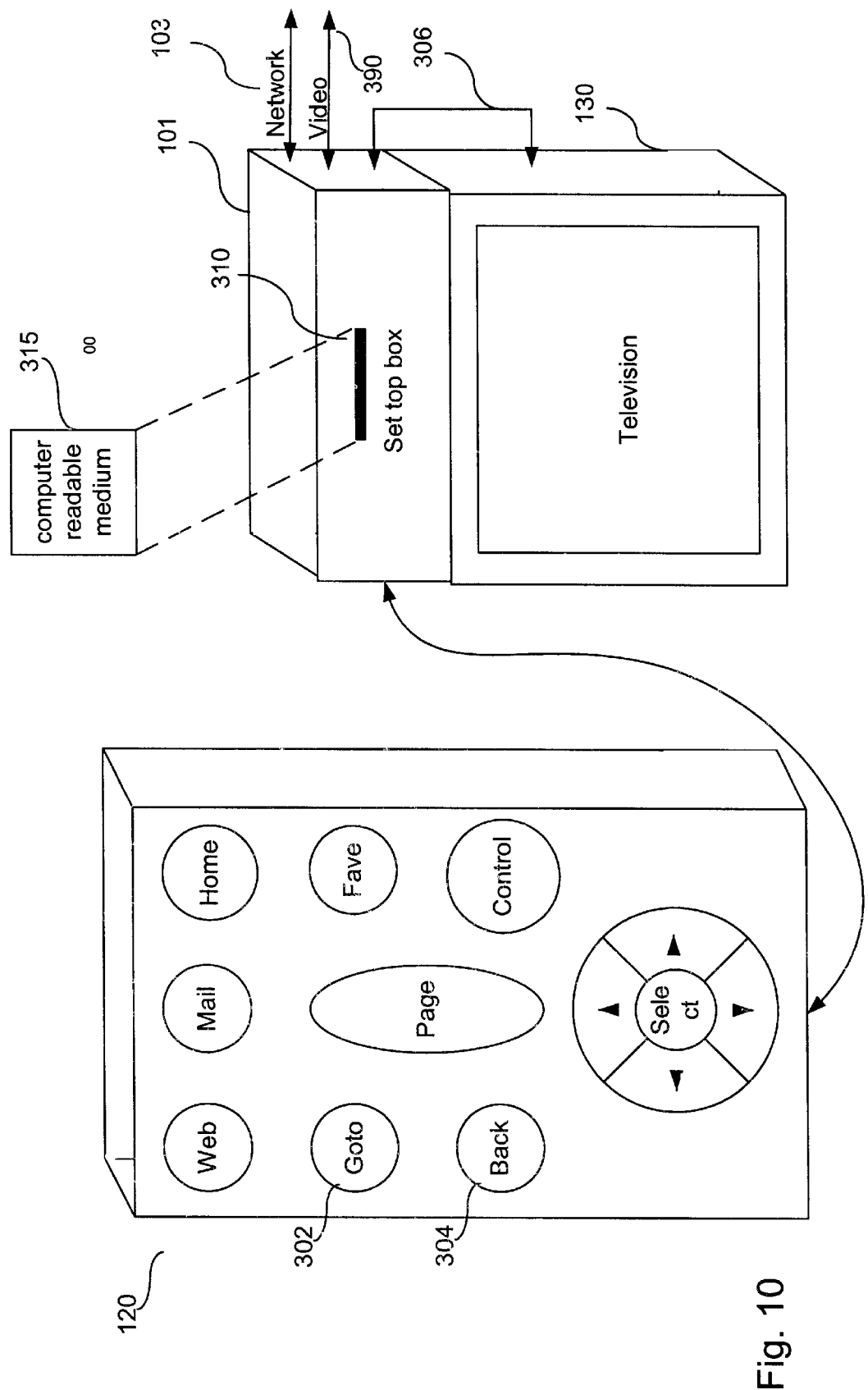
FIG. 10 shows an alternate embodiment of the present invention that includes a mechanism for introducing new programming to the system.

FIG. 10 shows an alternate embodiment of the present invention that includes a mechanism 310 for introducing new programming to the system. Specifically, mechanism 310 can be a disk drive, a CD ROM drive, a DVD drive, or other appropriate way of inputting new programming and/or data (e.g., on computer readable medium 315). In contrast, to the system shown in FIG. 3, which is a simple, low-cost system, the system of FIG. 10 can accept new programming via any appropriate mechanism 310 (including via a network such as the internet). A system incorporating the present invention can also be a general purpose computer, since, as a general matter, the present invention is not limited solely to set top boxes.

In summary, the described embodiment of the present invention allows a user of a computer system with a limited or simple user interface to escape from Java modal dialog boxes generated by errant applets without having to turn off the system. The described embodiment circumvents the standard situation where an open Java modal dialog box receives all user input. Instead, the described embodiment traps user input to a main browser loop in which generates appropriate events for other portions of the system to cause the Java modal dialog box to be removed or hidden.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method performed by a browser to escape from a displayed modal dialog box generated by an errant applet, comprising:

diverting user input from the applet to a main browser loop;

receiving a user key press; and if the user key press is a first escape key, sending a close window event to an execution environment of the applet, and if the user key press is a goto key press, closing the modal dialog box being closed by a Java environment, and displaying a new page by the browser.

2. The method of claim 1, further comprising:

if the user key is a second escape key:

displaying a second dialog box to receive a page address from the user;

fetching and displaying a new page by the browser; and
creating a hide dialog box event in the execution environment of the applet.

3. The method of claim 1, wherein the first type of escape key is a back key.

4. The method of claim 2, wherein the second type of escape key is a goto key.

5. The method of claim 1, included at least three executing threads, which are a main browser thread, a goto thread, and a Java JVM thread.

6. The method of claim 1, wherein the applet is a Java applet.

7. The method of claim 1, wherein a back key press results in the modal dialog box being closed when the applet contains a routine to process a dialog close event.

8. A method performed by a browser to escape from a displayed modal dialog box generated by an errant applet, comprising:

diverting user input from the applet to a main browser loop;

receiving a user key press; and if the user key press is a first escape key,
    sending a close window event to an execution environment of the applets, and if the user key is a second escape key,
    displaying a second dialog box to receive a page address from the user,
      fetching and displaying a new page by the browser, and creating a hide dialog box event in the execution environment of the applet.

9. The method of claim 8, wherein the first type of escape key is a back key.

10. The method of claim 9, wherein the second type of escape key is a goto key.

11. The method of claim 8, included at least three executing threads, which are a main browser thread, a goto thread, and a Java JVM thread.

12. The method of claim 8, wherein the applet is a Java applet.

13. The method of claim 8, wherein a back key press results in the modal dialog box being closed when the applet contains a routine to process a dialog close event.

14. The method of claim 8, wherein a goto key press results in the modal dialog box being closed by a Java environment and a new page displayed by the browser when the user presses a goto key.

* * * * *